Figure 1:
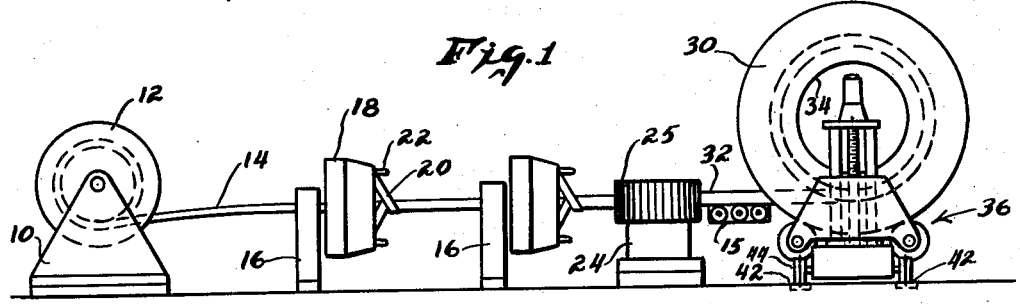

Sept. 10, 1963

O. G. GARNER 3,103,322

TRUNNION ROLL TYPE TAKEUP STAND

Filed June 20, 1962

2 Sheets-Sheet 1

INVENTOR.
OSCAR G. GARNER
BY
ATTORNEYS

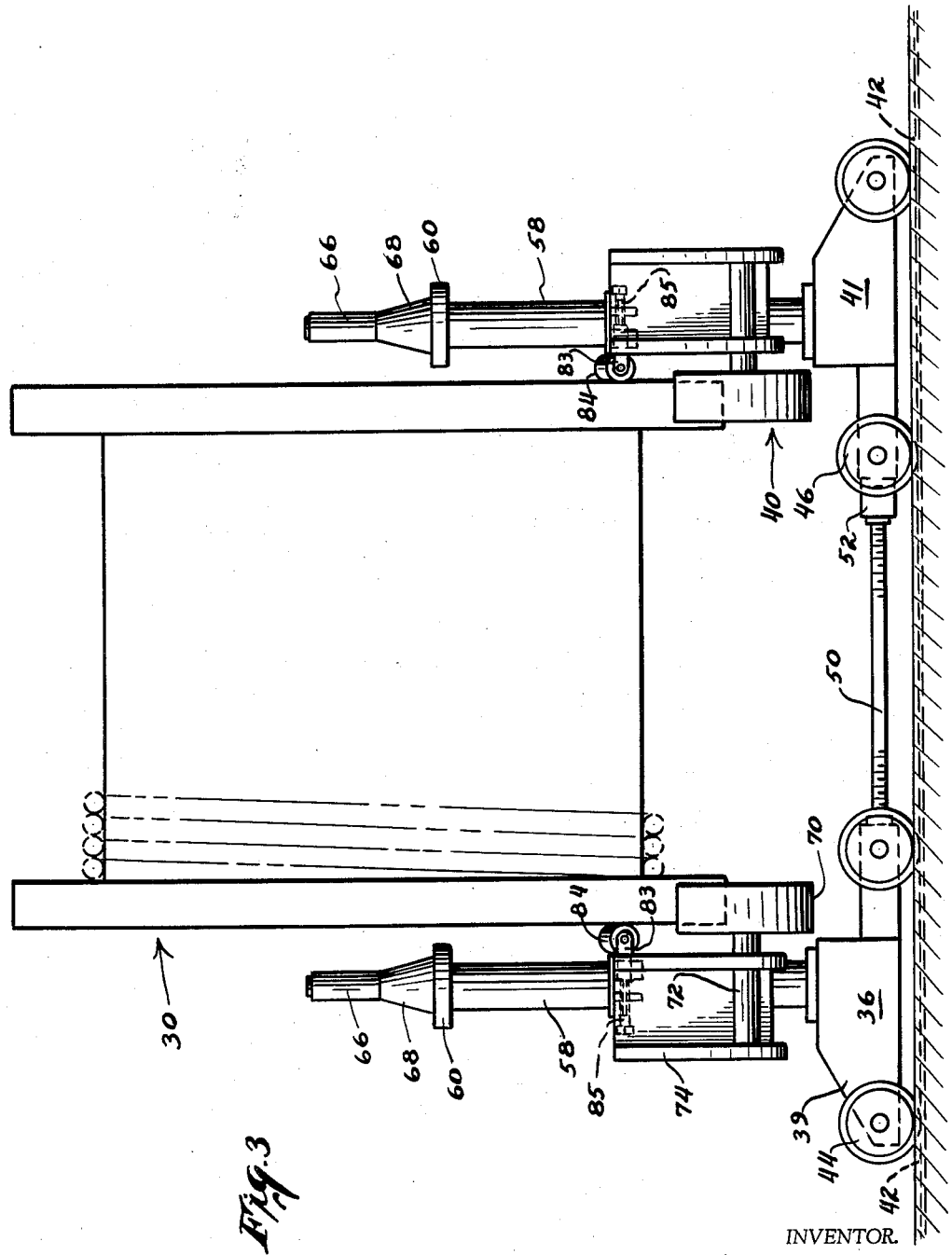

United States Patent Office 3,103,322
Patented Sept. 10, 1963

3,103,322
TRUNNION ROLL TYPE TAKEUP STAND
Oscar G. Garner, Westfield, N.J., assignor to General Cable Corporation, New York, N.Y., a corporation of New Jersey
Filed June 20, 1962, Ser. No. 203,942
6 Claims. (Cl. 242—86.5)

This invention relates to a cable takeup reel stand and, more particularly, to a stand for large, hubless takeup reels to receive paper insulated cable fed onto the reel in a straight line.

During fabrication of high voltage paper insulated cable, it has been found desirable to maintain the cable in a straight line throughout the manufacturing process, bending it only as it is received on a large takeup reel. As cable voltage requirements increase, the thickness of the insulation and concomitantly the diameter of the cable increases. Thus, the diameter of the takeup reel must be progressively increased to avoid a bending radius so sharp as to adversely affect the cable insulation. For example, with cable insulated for 345 kv., the takeup reels are extremely large, such as 16 feet in diameter. To enable straight line movement of the cable directly onto the drum of such a reel, the drum must be fed tangentially to the winding circumference as it is taken up on the drum.

Top feed of the cable, in which the cable is laid onto the top of the rotating takeup reel, requires that the reel be mounted in a deep pit below the plane of equipment mounting. With such large reels, construction of deep pits of large area is hazardous and costly.

Bottom feed of the cable, in which the starting end of the cable enters the reel on the bottom side of the drum, is preferably used for ease of observation of the cable being reeled, control of the process of manufacture, such as adjustments of reel position in accordance with observed conditions, and for elimination of the hazards of large, deep pots. A typical arrangement of this type is illustrated in FIG. 4 of U.S. Patent No. 2,998,692.

With reels of such large diameter hubs, it becomes more important that reels without end spider assemblies be employed. Such reels may then be inserted within impregnating tanks having annular plugs in the center thereof. By the use of such reels in combination with such an impregnating tank considerable ecomonies can be effected by reducing the needed oil volumes and by reducing the needed capacities of processing equipment.

It is, therefore, the primary object of this invention to provide an improved takeup stand for takeup reels in which the reel is rotatably carried by trunnions to receive on the bottom side of the drum paper insulated cable manufactured in a straight line assembly method.

It is a further object of this invention to provide an improved takeup stand to rotatably mount a takeup reel in which the reel may be positioned to receive the manufactured cable in a straight line from the taping heads both initially and during filling of the reel.

It is a still further object of this invention to provide a takeup stand for hubless reels of large diameters which may be adjusted to receive reels of varying width and diameters.

In accordance with these objects, there is provided in a preferred embodiment of this invention, a takeup stand comprising a first and second carriage positioned astraddle an annular takeup reel.

Figure 2:
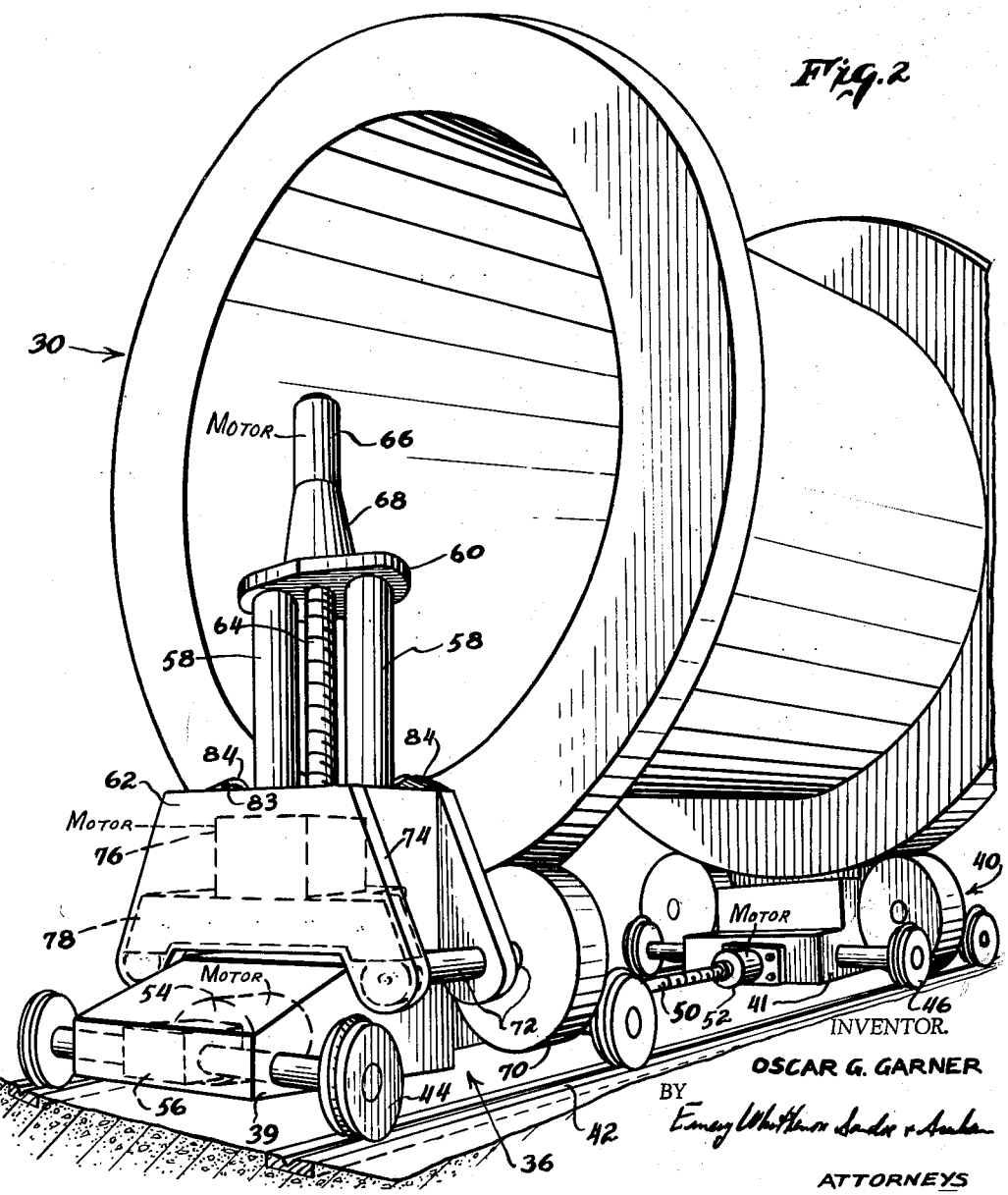

This invention will be described in greater detail along with further objects and advantages thereof in the following portions of the specification which may best be understood by reference to the accompanying drawings, of which:

FIG. 1 is a schematic view of the cable assembly line utilizing the takeup reel of the present invention;
FIG. 2 is a perspective view of the takeup stand in accordance with the present invention; and
FIG. 3 is an elevation view of the takeup stand shown in FIG. 2.

In FIG. 1, there is shown an assembly line for the production of paper insulated high voltage cable which comprises a payoff stand 10 carrying a payoff reel 12 on which is wound the bare conductor 14. The conductor is fed through the required plurality of paper taping stands 16. Each of the paper taping stands carries a rotatable paper taping head 18 which spins about the cable applying a plurality of wrappings of paper tape 20 from spools 22 thereon.

The paper taping stands are preferably located in rooms in which the humidity can be controlled accurately.

A caterpillar type capstan 24 is mounted with the tracks 25 thereof astraddle the cable to pull the cable from the paper taping heads at a predetermined, controlled rate. The capstan is aligned with the paper tapes so that the cable is moved in a straight line along its axis without bending as it passes through the heads and the capstan. A takeup reel 30 is mounted in cable receiving relationship to the cable being pulled from the capstan so that the cable 32 extends in a straight line along the cable axis with the cable reaching the hub 34 in tangential relationship thereto. The takeup reel 30 is driven to maintain a predtermined tension on the cable, and with the employment of supporting rolls 15 thereby prevents a catenary sag between the capstan and the reel.

The straight line method of manufacturing paper insulated high voltage cable, along with the advantages thereof, is set forth in U.S. Patent 2,998,692, to which reference may be had for further details thereof. The present invention relates to the takeup stand 36, the explanation of the straight line cable assembly method not constituting any portion of this invention, but being set forth herein for clarity.

The takeup stand shown in the figures comprises carriages 36 and 40 positioned astraddle the takeup reel 30. Each carriage consists of trucks 39, 41, which are movably mounted upon the rails 42 by means of the wheels 44 and 46. The carriages are coupled together at a selectable distance by a lead screw 50 engaging a threaded shaft in the truck 39. The shaft is fixedly positioned in truck 41 and is rotatably driven by a reversible electrical motor 52. In this manner, the distance between carriages may be adjusted by the operator merely by application of the energizing current to the motor 52 of the polarity desired for separation or bringing together of the carriages. In this manner, the carriages may be positioned in accordance with the flange-to-flange distance of the takeup reel.

To traverse the takeup stand as the reel receives cable thereon, the wheels 44 are driven through an electrical motor 54 and transmission 56. In many cases, it will be desirable to power all four wheels of each truck. However, I have found it satisfactory to power two wheels of each truck in most applications.

Mounted rigidly on each truck and extending vertically upward therefrom are parallel rails 58 which are coupled together at the upward end by a horizontal strap 60. A yoke 62 is slidably mounted on the rails. The vertical position of the yoke of each carriage is adjustably controlled by a lead screw 64 driven by a reversible electrical motor 66 through a suitable reduction transmission 68. Each yoke carries two trunnion rollers 70 mounted on shafts 72 which are journalled within the end flanges 74 of each yoke. The trunnion rollers are driven to apply the desired tension to the cable. For this purpose, there is provided an electric motor 76 to drive the trunnion roller shaft 72 through a suitable reduction transmission 78. The transmission may be a direct transmission and the trunnion roller speed controlled by governing the speed of the motor. In many cases, it is desirable to apply a predetermined tension to the cable, in which case the transmission may preferably include a slipping clutch of mechanical or hydraulic nature driven by a constant speed motor.

In order to position the reel within the takeup stand, guide rollers 84 are provided to engage the surfaces of the flanges of the reel 30. The guide rollers are mounted in slotted shafts 83, the position of which is adjustably fixed by rotation of threaded shaft 85. The guide rollers are adjusted to bear on the flanges of the takeup reel to properly position the reel within the stand. The carriage separation is adjusted so that the trunnion roller separation distance is equal to or greater than the drum width. Thus, the flanges of the reel are carried so that the inner face thereof is flush with or overlapping the facing surfaces of the trunnion rolls. By so positioning the takeup reel, cable may be payed thereon without interference by the trunnion rollers.

Thus, there is provided a takeup stand which can be traversed so that the cable maintains a straight line during manufacture, until it is received on the drum. Traversing the reel in the horizontal plane lays the cable in a helix on the hub of the reel, and traversing the vertical plane enables positioning of the reel for successive layers of cable thereon.

By the use of an annular drum without spiders in the ends thereof, the takeup reel may, when it is filled with cable, be moved directly into a domed impregating tank of the nature disclosed in application Serial No. 193,948, filed May 11, 1962, for Cable Impregnating Tank.

The trunnions support and carry the reel flanges. Since they do not extend beyond the flanges to cover the hub, they will not interfere with the paying of the cable in a straight line onto the reel hub. This lack of interference is, of course, necessary when paying cable onto the bottom of the takeup reel as is mandatory when utilizing reels of presently contemplated sizes.

This invention may be variously modified and embodied within the scope of the subjoined claims.

What is claimed is:

1. A reel stand for an annular takeup reel comprising first and second carriages positioned astraddle said annular reel, each of said carriages comprising a truck having rollers to engage a track for horizontal movement of said carriages, vertically extending rails mounted on said truck and extending upwardly therefrom, a strap securing the upper ends of said rails, a yoke slidably mounted upon said rails, a lead screw mounted parallel with said rails and being journalled in said truck and said strap, and threadably engaging said yoke, means for rotating said lead screw to adjust the vertical positioning of said yoke, at least two trunnion rollers mounted on trunnion shafts, said trunnion shafts being journalled in said yoke, and means for coupling said carriages together at an adjustable separation distance.

2. A stand in accordance with claim 1 in which the carriage separation is such that the distance between the facing inside surfaces of the trunnion rollers is at least equal to the drum width of the takeup reel, and includes guide rollers to position the reel within the stand so that the inside surfaces of the reel flanges are flush with or protrude beyond the inside surface of the supporting trunnion rolls.

3. A stand in accordance with claim 1 which includes means for rotatably driving said trunnion rollers.

4. A stand in accordance with claim 1 in which said carriage coupling means comprises a lead screw journalled in one of said carriages and threadably engaging the other of said carriages and which includes means for rotatably driving said lead screw.

5. A stand in accordance with claim 1 which includes guide rollers to position the reel within the stand, said guide rollers being mounted in each yoke and extending therefrom.

6. A stand in accordance with claim 1 which includes means for driving said track engaging rollers to traverse said stand along said track.

References Cited in the file of this patent

UNITED STATES PATENTS

| | | |
|---|---|---|
| 2,039,250 | Junge | Apr. 28, 1936 |
| 2,738,935 | Greene | Mar. 20, 1956 |
| 2,958,478 | Petersen et al. | Nov. 1, 1960 |